United States Patent [19]

Schumacher

[11] Patent Number: 4,784,015

[45] Date of Patent: Nov. 15, 1988

[54] MOMENTUM COMPENSATED ROTARY ACTUATOR WITH HARMONIC DRIVE

[76] Inventor: Larry L. Schumacher, 18876 Tenderfoot Trail, Newhall, Calif. 91321

[21] Appl. No.: 6,231

[22] Filed: Jan. 23, 1987

[51] Int. Cl.[4] .............................. F16H 33/00
[52] U.S. Cl. ..................................... 74/640
[58] Field of Search ......................... 74/640

[56] References Cited

U.S. PATENT DOCUMENTS

| | | | |
|---|---|---|---|
| 3,709,059 | 1/1973 | Elsel | 74/640 X |
| 4,518,308 | 5/1985 | Grzybowski et al. | 74/640 X |
| 4,566,352 | 1/1986 | Stiff | 74/640 |
| 4,646,587 | 3/1987 | Danel | 74/640 |

*Primary Examiner*—Dirk Wright

[57] ABSTRACT

The momemtum compensated actuator in this invention directly torques the compensating inertia relative to the pointed structure with the harmonic drive used to insure the rotational rate ratio between the compensating inertia and pointed structure is constant at all times. Improvements to the actuator are:

1. a harmonic drive wave generator shaft coupling that is torsionally very stiff with no backlash about the wave generator rotational axis, but is compliant to small wave generator motions orthogonal to the rotational axis due to harmonic drive ring gear-flexspline tooth mesh errors;
2. a shaft link between the pointed structure and the base vehicle with a threaded means to compressional preload all the rotational structure support ball bearings;
3. a means to provide a rotational bias rate to the actuator rotational reference structure assuring that during pointing each rotating structure support ball bearing race has a different rotational rate eliminating non linear stiction friction effects.

7 Claims, 1 Drawing Sheet

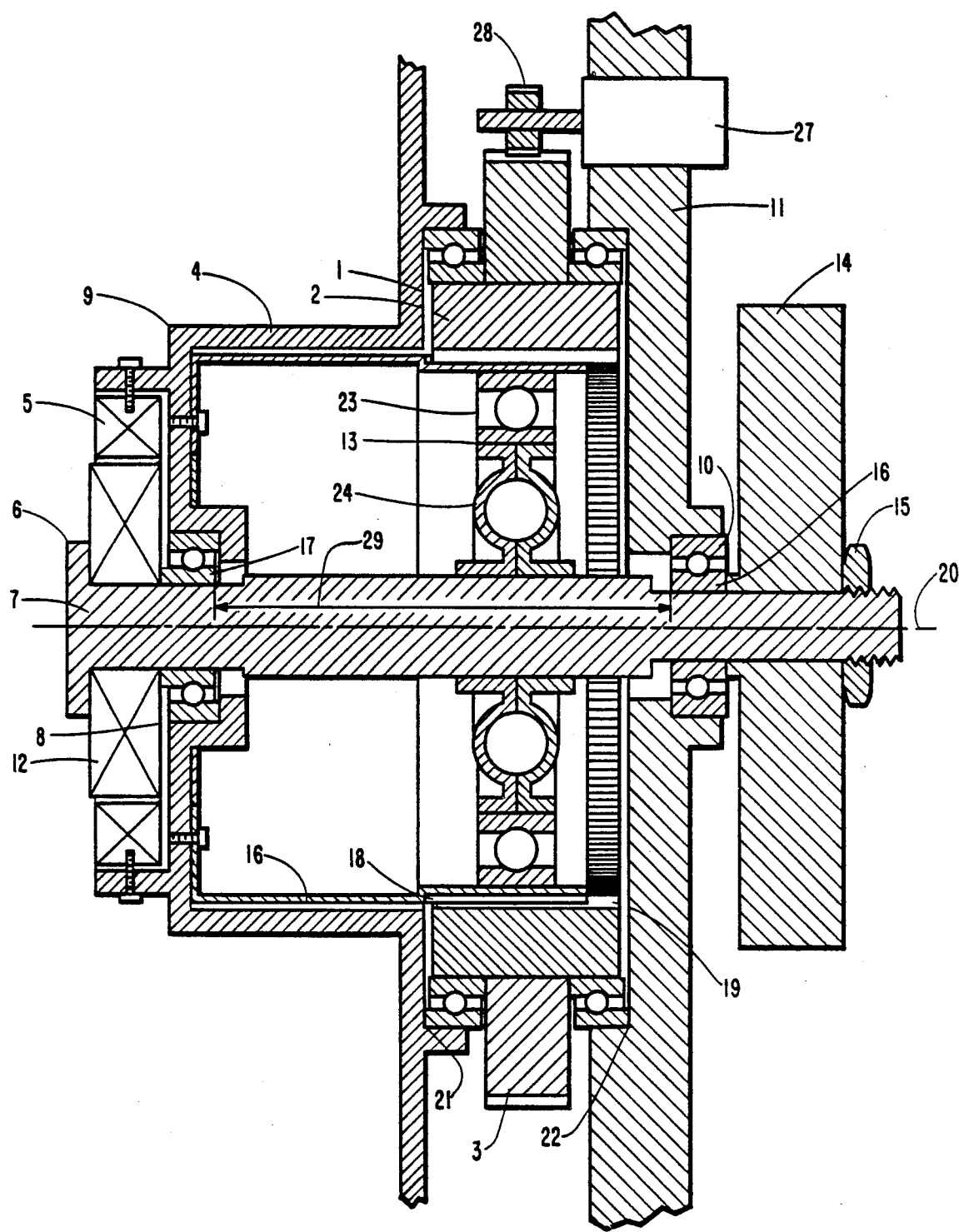

MOMENTUM COMPENSATED ROTARY ACTUATOR WITH HARMONIC DRIVE

BACKGROUND OF THE INVENTION

1. Field of the invention.

The invention is a mechanism for rotationally articulating a pointed device relative to a compensating inertia.

2. Description of Prior Art

Vibrations in large flexible space vehicles cause pointing disturbances for precision instruments attached to the base vehicle. Pointing systems which torque the pointed devices relative to the flexible base vehicle can cause base vehicle structural instabilities and disturb other pointed devices. Momentum compensation schemes have been used to torque pointed devices relative to rigid compensating inertias to minimize base vehicle disturbances, but these momentum compensating devices have been excessively massive or introduce unacceptable pointing disturbances due to mechanism nonlinearities. To minimize the mass of compensating inertias, they are generally rotated more rapidly in the opposite direction than the devices they compensate. The ratio of the compensating inertia angular rate to the pointed device angular rate must be kept constant to assure accurate momentum compensation. Momentum compensation methods include motor driven pointed devices with motor driven compensating inertias, or one motor with mechanical speed reduction methods such as belts and pullies or gear trains between the pointed device and compensating inertia. Momentum compensation methods that require measurement of the pointed device and compensating inertia rotational rates do not have adequate sensors or controllers to provide the fixed rotational rate ratio required for precision pointing. Mechanically slaved pointed devices and compensating inertias have fixed rotational rate ratios but excessive backlash and other nonlinearities result in discontinuities in the fixed rotational rate ratio at rotational rate polarity changes making them unsuitable for precision pointing applications. The "harmonic drive" speed reduction device is ideally suited as a momentum compensating mechanism because it has a large single step rotational speed reduction with negligible backlash. The problem to date has been defining a momentum compensation configuration that is compatible with the idiosyncracies of the harmonic drive mechanism and precision pointing requirements. Actuator designs that avoid torsional windup in the torque transmission path torque the compensating inertia relative to the pointed device and use the harmonic drive to assure a fixed rotational speed ratio between the pointed device and the compensating inertia relative to the base vehicle. The problems with the existing designs are:

1. The harmonic drive ring gear is a rigid cylinder attached to the base vehicle with teeth on the internal cylindrical surface which are forced in contact with the external teeth of a flexible cylindrical flexspline by a rigid eliptical wave generator rotating on the cylindrical axis common to wave generator, ring gear and flexspline. Ring gear eccentricities and ring gear-flexspline tooth mesh errors result in translation of the instantaneous wave generator rotational axis in the plane orthogonal to the fixed ring gear cylindrical axis. Current methods used to accomodate the translation of the wave generator rotational axis are: 1. to support the rigid wave generator in a cantilevered fashion which permits rotational axis translation, or 2. support the wave generator in a loose coupling that permits the wave generator to translate relative to a rigid rotational axis. Method 1 is torsionally stiff with no bachklash, but does not provide any means to preload rotational element support bearings, and method 2 introduces rotational backlash.

2. The ball bearings which support the pointed device, and other rotating elements do not have a rotational axis preload mechanism which is the means to effect a controlled amount of bearing ball shear between the outer and inner ball bearing races. The bearing preload is the means to provide a rotationally true axis and prevent wobble from mass centers off the rotational axis.

3. Periodic base vehicle angular rate periodically passes through zero. Existing actuator designs have all rotational elements angular rates proportional to base vehicle angular rate so that all rotation element bearing races of the pointed devices simultaneously pass through zero angular rate relative to the base vehicle. At this instant, extremely nonlinear stiction friction torques act on the pointed device which must be precisely offset by the pointing system to effect precision pointing. Current sensors, actuators and control systems do not have adequate resolution or response time to precisely offset the nonlinear torques and pointing error results.

Accordingly it is the object of this invention to provide the following improvements in the momentum compensated rotary actuator with harmonic drive:

1. provide a harmonic drive wave generator shaft coupling means that has no backlash, high torsional stiffness, and low resistance to translational forces orthogonal to the rotational axis.
2. provide a means to provide adjustable axial preload forces to all pointed device rotational support ball bearings.
3. provide a means to bias the angular rate across pointed device support bearings so that the angular rate of each bearing race is never the same avoiding the nonlinear stiction friction torque disturbances.

BRIEF DESCRIPTION OF DRAWINGS

FIG. 1 is a half section of the harmonic drive momentum compensated actuator with the section plane containing the rotational axis.

SUMMARY OF THE INVENTION

The momentum compensated harmonic drive actuator configuration is determined by the operational idiosyncracies of the harmonic drive speed reducer and the requirements of precision pointing. The harmonic drive consists of three parts:

1. the ring gear is a rigid cylindrical gear with gear teeth on the interior cylindrical surface and is the harmonic drive rotational reference body;
2. the flexspline is a flexible cylindrical gear with gear teeth on the exterior cylindrical surface attached to the pointed device;
3. the wave generator is an eliptical cam which forces the flexspline gear teeth into mesh with the ring gear teeth, and is fixedly attached to the compensating inertia structure.

The momentum compensated actuator is configured such that the actuator motor torques the compensating inertia attached to the wave generator relative to the pointed device attached to the flexspline. The resulting relative motion between the wave generator and the flexspline causes flexspline gear teeth to engage the ring gear teeth which insures the compensating inertia angular rate is fixed at a negative harmonic gear ratio times the pointed device angular rate Another improvement in the harmonic drive actuator links the pointed device to the base vehicle with a rigid shaft rotationally supported in ball bearings relative to the pointed device and base vehicle and is a part of the compensating inertia. The rigid shaft has a threaded means for adjusting the distance between the pointed device and base vehicle bearing shaft attachments that compressionally preloads all ball bearings supporting rotating actuator elements. Another improvement in the harmonic drive actuator has the wave generator attached to the rigid shaft through a hollow torus shaped coupling that is torsionally very stiff about the shaft rotational axis but is translationally compliant to small wave generator motion orthogonal to the shaft axis.

Another improvement in the harmonic drive actuator has the harmonic drive ring gear attached to a rotational reference structure which is supported on bearings so that it can rotate relative to the base vehicle. A bias motor and gear mechanism rotates the ring gear and rotational reference structure relative to the base vehicle at a bias angular rate, and the pointed device is supported in bearings so that it can rotate relative to the harmonic drive ring gear and rotational reference structure. The actator motor torques the pointed device relative to the compensating inertia such that the resulting pointed device angular rate relative to the ring gear is about equal and opposite to the bias rate so that the pointed device angular rate relative to the base vehicle is equal to the pointing target angular rate Therefore, the ball bearings supporting the rotating actuator elements have one race rotating at one angular rate and the other race rotating at a different angular rate.

DETAILED DESCRIPTION OF THE INVENTION

The harmonic drive momentum compensated actuator has three structures which are rotational driven relative to each other. Rotational reference structure 1 consists of:

harmonic drive ring gear 2 which is a rigid cylindrical gear with gear teeth 19 on the interior cylindrical surface; bias gear 3 which is a rigid cylindrical gear with gear teeth on the external cylindrical surface fixedly attached to gear 2 on the interior cylindrical surface.

Pointed device structure 9 consists of:
pointed device and support platform structure 4; actuator motor stator 5 fixedly attached to structure 4; harmonic drive flexspline 16 which is a flexible cylindrical gear with gear teeth on the external cylindrical surface on one end and fixedly attached to structure 4 on the other end.

Compensating inertia structure 6 consists of:
shaft 7 which is rotationally supported in bearing 8 relative to structure 4 and rotationally supported by bearing 10 relative to base vehicle structure 11;
actuator motor rotor 12 fixedly attached to shaft 7; harmonic drive wave generator structure 13 fixedly attached to shaft 7;
flywheel 14 attached to shaft 7 concentric with axis 20; ball bearing race 16 attached to shaft 7 concentric with to axis 20; ball bearing race 17 attached to shaft 7; shaft nut 15 attached by threads to shaft 7.

The actuator motor torques motor stator 5 and structure 9 with one polarity and motor rotor 12 and compensating inertia structure 6 with the opposite polarity. Rotation of wave generator 13 relative to flexspline 16 forces flexspine teeth 18 to interact with ring gear teeth 19 to assure that:

$$-NxWp/r = Wc/r$$

$-N$ = harmonic gear ratio (the minus sign indicates platform structure 9 and compensating inertia 6 rotate with opposite polarities); $Wp/r$ = angular rate of platform structure 9 relative to ring gear 2; $Wc/r$ = angular rate of compensating inertia 6 relative to ring gear 2. Sizing the compensating inertia 6 rotational inertia Ic about axis 20 and platform structure 9 rotation inertia Ip about axis 20 such that:

$$Icx\ Wc/r = -Ipx\ Wp/r$$

results in momentum compensation relative to ring gear 2.

Improvements in the harmonic drive momentum compensated actuator include:

Rigid shaft 7 is rotationally supported relative to platform structure 9 by ball bearing 8 and is rotationally supported relative to base vehicle 11 by ball bearing 10. Shaft nut 15 plus slidable shaft attachment with bearing race 16 and flywheel 14 is the mechanism that enables shortening the distance 29 between the bearing races 16 and 17. The preload axial forces in actuator rotating element support bearings 8,10,21,22 results from compressional forces caused by nut 15 changing the distance 29.

Eccentricities in ring gear 2 internal gearing and tooth mesh misalignments between 18 and 19 require compliance in wave generator 13 orthogonal to axis 20 of rigid shaft 7. Compliance between wave generator sliding surface structure 23 and shaft 7 is provided by hollow toroidal coupling 24 which is attached between shaft 7 and sliding surface structure 23. Coupling 24 provides a torsionally rigid wave generator coupling about axis 20 with compliance to small movements of 23 orthogonal to axis 20. An angular rate difference across actuator rotational elements 1,9,6 support bearings 8,10,21,22 inner and outer races is provided by a bias rate mechanism consisting of bias gear 3, bearing 22, bias motor 27, and gear 28. Bias gear 3 is a rigid cylindrical gear fixedly attached on the interior cylindrical surface to ring gear 2 with gear teeth on the exterior cylindrical surface. Bearing 22 rotationally supports rotational reference structure 1 and bias gear 3 relative to base vehicle 11. The bias motor 27 attached to base vehicle 11 rotates bias gear 3 and rotational reference structure 1 at a bias angular rate relative to base vehicle 11. Actuator motor status 5 torques platform structure 9 relative to motor stator 12 and compensating inertia structure 7 until platform structure angular rate relative to the base vehicle 11 is equal to the pointing target angular rate relative to the base vehicle 11. Therefore relative to the base vehicle 11, bearing 8 has the compensating inertia 7 angular rate on one bearing race and the pointed structure 9 angular rate on the other race, bearing 10 has the compensating inertia 6 angular rate on one bearing race and zero on the other race, bearing 21 has the pointed structure 9 angular rate on one bearing race and rotational reference structure 1 bias angular rate on the other, bearing 22 has rotational reference structure 1 bias angular rate on one bearing race and zero on the other race.

Having described the invention I claim:

1. An improved momentum compensated actuator of the type with a compensating inertia torqued relative to a pointed structure using a harmonic drive speed reducer to assure the rotational rate of the compensating inertia relative to a harmonic drive ring gear being the negative harmonic drive gear ratio times the pointed structure's rotational rate relative to the harmonic drive ring gear wherein the improvement comprises:

means to axially preload rotational element support ball bearings and rotationally support rotating momentum compensated actuator elements relative to each other and to the base vehicle structure;

a harmonic wave generator coupling means with a torsionally stiff rotational axis and with translational compliance orthogonal to the rotational axis.

2. The momentum compensated actuator of claim 1 wherein the harmonic drive wave generator coupling means with a torsionally stiff rotational axis and with translational compliance orthogonal to the rotational axis comprises a hollow toroid structure being attached on an interior circular perifery of the hollow toroid structure to the compensating inertia shaft and being attached on an exterior circular perifery of the hollow toroid structure to the harmonic drive wave generator structure that forces harmonic drive flexspline teeth to engage harmonic drive ring gear teeth.

3. An improved momentum compensated actuator of the type described in claim 1 with the harmonic drive ring gear fixedly attached concentric with a bias gear, the harmonic drive ring gear being rotated relative to an actuator support structure by a bias motor attached to the actuator support structure wherein the improvement to provide each actuator element rotating relative to the actuator rotational axis a different rotational rate for each rotational support bearing race comprises:

a harmonic drive ring gear preloadable ball bearing rotational support means;

a pointed structure rotational support means relative to the rotating ring gear;

a compensating inertia rotational torquing and support means relative to the pointed structure.

4. The means to provide each actuator element rotating relative to the actuator rotational axis a different rotational rate for each rotational support bearing race of claim 3 wherein the harmonic drive ring gear preloadable ball bearing rotational support means comprises a ball bearing rotationally supporting the harmonic drive ring gear relative to a base vehicle structure with one ball bearing race being axially held in forcible contact with the base vehicle structure and with one ball bearing race being held in axial forcible contact with the harmonic drive ring gear by axial forces produced by the means to axially preload rotational element support bearings and rotationally support rotating momentum compensated actuator elements relative to each other and to the base vehicle structure.

5. The means to provide each actuator element rotating relative to the actuator rotational axis a different rotational rate for each rotational support bearing race of claim 3 wherein the pointed structure rotational support means relative to the rotating ring gear comprises a ball bearing rotationally supporting the pointed structure relative to the harmonic drive ring gear, with one of the ball bearing races being axially held in forcible contact with the harmonic drive ring gear and with one of the ball bearing races being held in forcible contact with the pointed structure by axial forces produced by the means to axially preload rotational element support bearings and rotationally support rotating momentum compensated actuator elements relative to each other and to the base vehicle structure.

6. The means to provide each actuator element rotating relative to the the actuator rotational axis a different rotational rate for each rotational support bearing race of claim 3 wherein the compensating inertia rotational torquing and support means relative to the pointed structure comprises a motor stator fixedly attached to the pointed structure torquing a motor rotor fixedly attached to the compensating inertia shaft with a ball bearing rotationally supporting said compensating inertia shaft and motor rotor relative to the pointed structure and with another ball bearing rotationally supporting the compensating inertia shaft relative to the base vehicle structure, each of the compensating inertia shaft rotational support ball bearing races being axially held in forcible contact with structure supporting the ball bearing races by axial forces produced by the means to axially preload rotational element support bearing and rotationally support rotating momentum compensated actuator elements relative to each other and to the base vehicle structure.

7. The momentum compensated actuator of claim 1 wherein the means to axially preload the rotational element support ball bearings and rotationally support rotating momentum compensated actuator elements relative to each other and to the base vehicle structure comprises a compensating inertia shaft concentric with all actuator rotating elements and supporting ball bearings, the compensating inertia shaft having a threaded means to axially preload all the supporting ball bearings by shortening the compensating inertia shaft between bearing races without creating axial forces in the harmonic drive ring gear and the harmonic drive flexspline teeth, the compensating inertia shaft passing through a hole in a planar area of the base vehicle structure with a preloaded ball bearing supporting the compensating inertia relative to one side of the planar area of the base vehicle structure and with another preloaded ball bearing supporting the ring gear on the opposing side of the planar area of the base vehicle structure, the preloaded ball bearings and compensating inertia shaft providing rotational support for the momentum compensating actuator relative to the base vehicle structure.

* * * * *